(12) United States Patent
Hattori et al.

(10) Patent No.: US 7,682,711 B2
(45) Date of Patent: Mar. 23, 2010

(54) MAGNETIC RECORDING MEDIUM, MAGNETIC RECORDING AND REPRODUCING APPARATUS, AND MANUFACTURING METHOD OF MAGNETIC RECORDING MEDIUM

(75) Inventors: Kazuhiro Hattori, Tokyo (JP); Takahiro Suwa, Tokyo (JP)

(73) Assignee: TDK Corporation, Tokyo (JP)

( * ) Notice: Subject to any disclaimer, the term of this patent is extended or adjusted under 35 U.S.C. 154(b) by 916 days.

(21) Appl. No.: 11/352,376

(22) Filed: Feb. 13, 2006

(65) Prior Publication Data

US 2006/0183004 A1     Aug. 17, 2006

(30) Foreign Application Priority Data

Feb. 15, 2005   (JP)  ............................. 2005-037753

(51) Int. Cl.
*G11B 5/65* (2006.01)

(52) U.S. Cl. .................................................. 428/833.2

(58) Field of Classification Search ................. 428/826, 428/831, 832.1, 832.2, 833, 833.1, 833.2, 428/834, 835, 836.1, 837, 848.5; 427/131
See application file for complete search history.

(56) References Cited

U.S. PATENT DOCUMENTS

| | | | |
|---|---|---|---|
| 6,014,296 A * | 1/2000 | Ichihara et al. ............. | 360/135 |
| 6,583,957 B1 | 6/2003 | Takeshita et al. | |
| 6,586,044 B1 | 7/2003 | Takeshita et al. | |
| 2004/0001964 A1 * | 1/2004 | Ohkura et al. .............. | 428/596 |
| 2004/0175510 A1 * | 9/2004 | Hattori et al. ............... | 427/454 |
| 2004/0191464 A1 * | 9/2004 | Hattori et al. .............. | 428/65.3 |
| 2005/0199581 A1 * | 9/2005 | Suwa et al. ................... | 216/22 |

FOREIGN PATENT DOCUMENTS

| | | | |
|---|---|---|---|
| JP | B2 6-60404 | | 8/1994 |
| JP | A 2000-195042 | | 7/2000 |
| JP | 2001043526 A | * | 2/2001 |
| JP | A 2002-133634 | | 5/2002 |
| JP | A 2004-039082 | | 2/2004 |
| JP | A 2004-295990 | | 10/2004 |
| JP | A 2004-326831 | | 11/2004 |

* cited by examiner

*Primary Examiner*—Holly Rickman
*Assistant Examiner*—Lisa Chau
(74) *Attorney, Agent, or Firm*—Oliff & Berridge, PLC

(57) ABSTRACT

A magnetic recording medium is provided which includes a recording layer formed in a concavo-convex pattern including recording elements formed as convex portions, provides a good flying performance of a magnetic head, and has high reliability. A magnetic recording and reproducing apparatus including that magnetic recording medium and a manufacturing method of that magnetic recording medium are also provided. The magnetic recording medium includes: the recording layer formed in a predetermined concavo-convex pattern over a substrate, the recording elements being formed as convex portions of the concavo-convex pattern; filling elements with which concave portions between the recording elements are filled; a conductive film which has a smaller electric resistivity than the filling elements and is formed over the filling elements; and a protective layer which covers the recording elements and the filling elements and is in contact with an upper surface of the conductive film.

9 Claims, 5 Drawing Sheets

MAGNETIC RECORDING MEDIUM, MAGNETIC RECORDING AND REPRODUCING APPARATUS, AND MANUFACTURING METHOD OF MAGNETIC RECORDING MEDIUM

BACKGROUND OF THE INVENTION

1. Field of the Invention

The present invention relates to a magnetic recording medium in which a recording layer is formed in a predetermined concavo-convex pattern and recording elements are formed as convex portions of the concavo-convex pattern, a magnetic recording and reproducing apparatus including that magnetic recording medium, and a manufacturing method of that magnetic recording medium.

2. Description of the Related Art

Conventionally, a protective layer is formed over a recording layer in a magnetic recording medium such as a hard disk in order to protect the recording layer against contact with a magnetic head or the like. The protective layer is required to have abrasion resistance and corrosion resistance. For example, a film of carbon called as diamond like carbon is specifically known as a material for the protective layer that meets the above needs, for example. Exemplary methods for forming such a carbon film over a recording layer are CVD (Chemical Vapor Deposition), IBD (Ion Beam Deposition), and bias sputtering, in each of which carbon is deposited over a surface while a bias voltage is applied to a substrate (see Japanese Examined Patent Publication No. Hei 6-60404,for example).

On the other hand, developments such as miniaturization of magnetic particles forming a recording layer, change of a material for the recording layer, and miniaturization of head processing have been made to largely improve areal density of a magnetic recording medium. The improvement of areal density is expected to continue. However, the improvement of areal density by conventional approaches has reached its limit, because many problems such as processing limits of a magnetic head, incorrect recording of information onto a track adjacent to a target track because of broadening of a recording magnetic field of the magnetic head, and crosstalk during reproducing have become remarkable. Thus, in order to further improve areal density, a discrete track medium and a patterned medium have been proposed, in which a recording layer is formed in a concavo-convex pattern and recording elements are formed as convex portions of the concavo-convex pattern.

For a magnetic recording medium such as a hard disk, flatness of the surface of the medium is important in order to achieve a stable flying performance of a magnetic head. In the discrete track medium and the patterned medium in which areal density is high and a magnetic gap is small, flatness of the surface of the medium is especially important and therefore it has been proposed to fill a concave portion between the recording elements with filling elements. It is preferable that the filling elements have high hardness and good corrosion resistance. Specific examples of a material for the filling elements include oxides such as $SiO_2$, nitrides, and carbides.

In order to fill the concave portions with the filling elements, a method can be used in which a filling material is deposited over the recording layer having the concavo-convex pattern by sputtering so as to fill the concave portions and thereafter an excess part of the filling material over the recording layer is removed by CMP (Chemical Mechanical Polishing) or dry etching such as ion beam etching so as to flatten a surface.

For the discrete track medium and the patterned medium, it has been proposed to form a protective layer of carbon over the recording elements and the filling element (see Japanese Patent Laid-Open Publication No. 2000-195042, for example).

When the concave portions between the recording elements are filled with the filling elements, an upper surface of the recording elements and an upper surface of the filling elements are flattened, and then those upper surfaces are covered with the protective layer, it is expected that a flying performance of a magnetic head can be made as favorable as that obtained by a magnetic recording medium in which a protective layer is formed over a continuous recording layer.

However, even if the discrete track medium or the patterned medium has the same level of surface roughness as the magnetic recording medium having the continuous recording layer, the same level of the flying performance of the magnetic head as that obtained for the magnetic recording medium having the continuous recording layer is not obtained for the discrete track medium or the patterned medium in some cases. That is, the discrete track medium and the patterned medium have a problem of reliability.

SUMMARY OF THE INVENTION

In view of the foregoing problems, various exemplary embodiments of this invention provide a magnetic recording medium in which a recording layer is formed in a concavo-convex pattern and recording elements are formed as convex portions of the concavo-convex pattern, provides a good flying performance of a magnetic head, and has high reliability, a magnetic recording and reproducing apparatus including that magnetic recording medium, and a manufacturing method of that magnetic recording medium.

According to the present invention, a magnetic recording medium includes a conductive film that has a smaller electric resistivity than filling elements and is formed over at least the filling elements out of recording elements and the filling elements, and a protective layer that covers the recording elements and the filling elements and is formed to be in contact with an upper surface of the conductive film.

In a process for making the present invention, the inventors earnestly studied a reason that, even if a discrete track medium or a patterned medium had approximately the same level of surface roughness as a magnetic recording medium including a continuous recording layer, a flying performance of a magnetic head which was as favorable as that obtained for the magnetic recording medium including the continuous recording layer was not obtained for the discrete track medium or the patterned medium in some cases. As a result, the inventors found that, when a protective layer of carbon was formed over the recording elements and the filling elements, amorphous carbon which had a polymer-like molecular structure and low hardness and which was not compact was formed in a part of the protective layer in some cases and intermittent contact of the magnetic head with that part caused a damage or deformation affecting the flying performance of the magnetic head.

It is unclear why polymer-like amorphous carbon is formed in a part of the protective layer. However, the inventors consider the reason as follows. The protective layer of carbon is deposited while a bias voltage is applied to a substrate. The recording elements are formed of a metal and have a small electric resistivity, whereas the filling elements are formed of an insulating material such as oxides, nitrides, or carbides and has a larger electric resistivity than the recording elements. Therefore, it is considered that there is a difference between the bias voltage applied onto the filling elements and that applied onto the recording elements. The inventors consider that, when the bias voltage is varied depending on a site and a difference between an actually applied bias voltage and an optimum bias voltage becomes partially large, amorphous carbon having a polymer-like molecular structure is formed in a part of the protective layer.

In order to overcome that problem, a conductive film having a smaller electric resistivity than the filling elements is formed on at least the filling elements and the protective layer is then formed to be in contact with the conductive film. In this case, it is considered that the bias voltage can be uniformly applied onto the filling elements and the recording elements and therefore formation of polymer-like amorphous carbon can be suppressed.

Moreover, static electricity can be easily generated in a magnetic recording medium in which a concave portions between recording elements are filled with filling elements, because the filling elements have a large electric resistivity. Thus, foreign matter such as dust can easily adhere to a surface of the magnetic recording medium. Such foreign matter is also considered as one factor affecting the flying performance of the magnetic head.

In order to overcome that problem, the conductive film having a smaller electric resistivity than the filling elements is formed over the filling elements. Thus, it is considered that generation of static electricity can be suppressed and degradation of the flying performance of the magnetic head caused by foreign matter such as dust can be suppressed.

In addition, when a continuous conductive film is formed from a single material on both the recording elements and the filling elements, the effect of suppressing the variation of the bias voltage during formation of the protective layer can be largely enhanced. In this case, it is expected that the effect of suppressing formation of polymer-like amorphous carbon be obtained even when the electric resistivity of the conductive film is equal to or larger than that of the filling element.

Accordingly, various exemplary embodiments of the invention provide a magnetic recording medium comprising:

a recording layer formed in a predetermined concavo-convex pattern over a substrate, recording elements being formed as convex portions of the concavo-convex pattern;

filling elements with which concave portions between the recording elements are filled;

a conductive film having an electric resistivity smaller than the filling elements, the conductive film being formed over at least the filling elements out of the recording elements and the filling elements; and a protective layer covering the recording elements and the filling elements and being in contact with an upper surface of the conductive film.

Alternatively, various exemplary embodiments of the invention provide a magnetic recording medium comprising:

a recording layer formed in a predetermined concavo-convex pattern over a substrate, recording elements being formed as convex portions of the concavo-convex pattern;

filling elements with which concave portions between the recording elements are filled;

a conductive film formed from a single material different from a material for the filling elements over the recording elements and the filling elements; and a protective layer covering the recording elements and the filling elements and being in contact with an upper surface of the conductive film.

In the present description, the "recording layer formed in a predetermined concavo-convex pattern in which recording elements are formed as convex portions over a substrate" shall refer to a recording layer obtained by dividing a continuous recording layer in a predetermined pattern into a number of recording elements, a recording layer that is obtained by partially dividing a continuous recording layer in a predetermined pattern and is formed by recoding elements which are continuous partially, a recording layer continuously formed on a part of a substrate, such as a spirally formed recording layer, and a continuous recording layer in which a convex portions and concave portions are formed.

In the present description, the "upper surface of a conductive film" shall refer to a surface of the conductive film on an opposite side to a substrate. The same can be applied to the "upper surface of recording elements" and the "upper surface of filling elements."

In the present description, the "magnetic recording medium" shall refer not only to a medium such as a hard disk, a floppy (registered trademark) disk, or a magnetic tape, which utilizes only magnetism for recording and reproducing information, but also to a magneto-optical recording medium such as an MO (Magneto Optical) disc, which utilizes magnetism in combination with light, and a recording medium of a heat-assisted type which utilizes magnetism in combination with heat.

According to the present invention, it is possible to realize a magnetic recording medium that includes a recording layer formed in a concavo-convex pattern in which recording elements are formed as convex portions, provides a good flying performance of a magnetic head, and has high reliability, and a magnetic recording and reproducing apparatus including that magnetic recording medium.

DETAILED DESCRIPTION OF THE PREFERRED EMBODIMENTS

Preferred exemplary embodiments of the present invention are now described in detail, with reference to the drawings.

Figure 1:
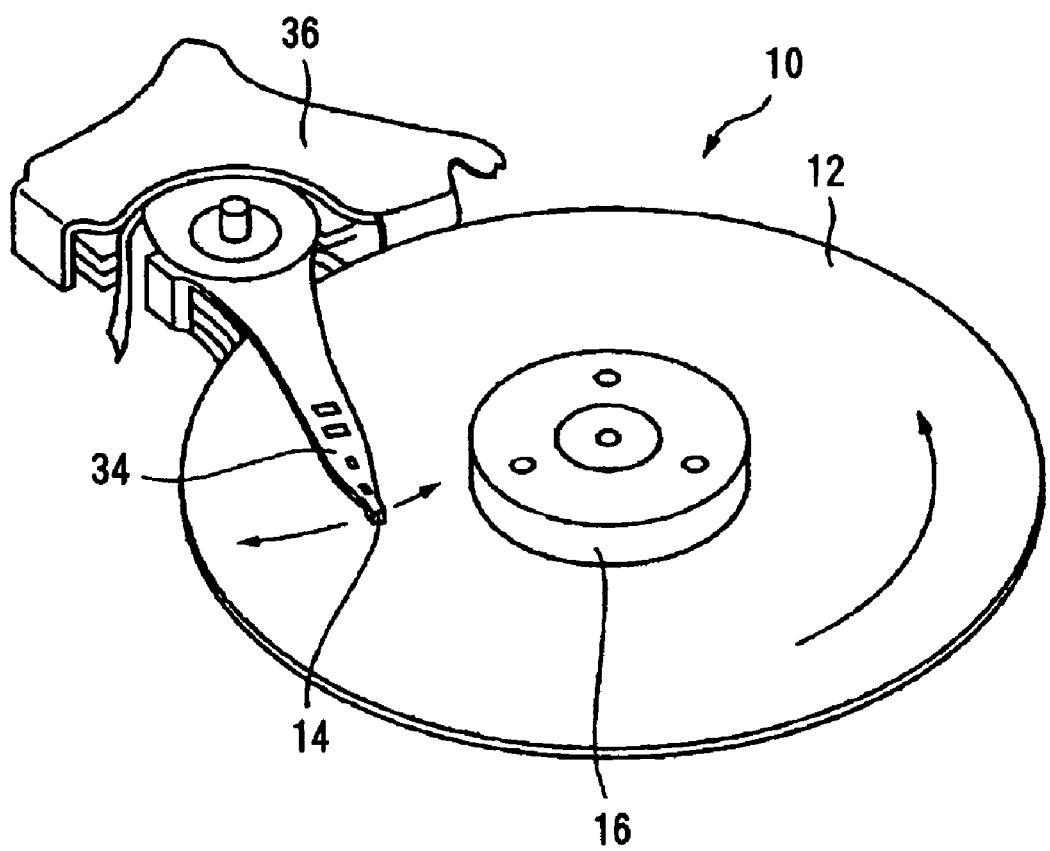
FIG. 1 is a schematic perspective view showing the general configuration of a main part of a magnetic recording and reproducing apparatus according to a first exemplary embodiment of the present invention.

As shown in FIG. 1, a magnetic recording and reproducing apparatus 10 according to a first exemplary embodiment of the present invention includes a magnetic recording medium 12, and a magnetic head 14 that is provided so as to fly close to a surface of the magnetic recording medium 12 in order to perform recording and/or reproducing of data with respect to the magnetic recording medium 12. The magnetic recording and reproducing apparatus 10 has a feature in the configuration of the magnetic recording medium 12. The description of the configuration of other parts is appropriately omitted because it does not seem necessary for understanding of the present exemplary embodiment.

The magnetic recording medium 12 is fixed to a chuck 16 and is rotatable together with the chuck 16. The magnetic head 14 is attached to an arm 18 near a top end of the arm 18. The arm 18 is attached to a base 20 to be pivotable. Because of this structure, the magnetic head 14 can fly and move above a surface of the magnetic recording medium 12 on an arc-like path along a radial direction of the magnetic recording medium 12.

Figure 2:
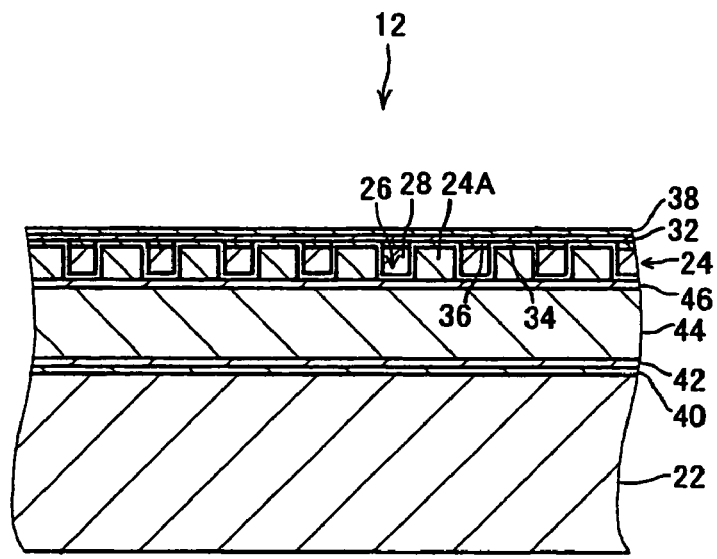
FIG. 2 is a schematic cross-sectional side view showing the configuration of a magnetic recording medium of the magnetic recording and reproducing apparatus.
Figure 3:
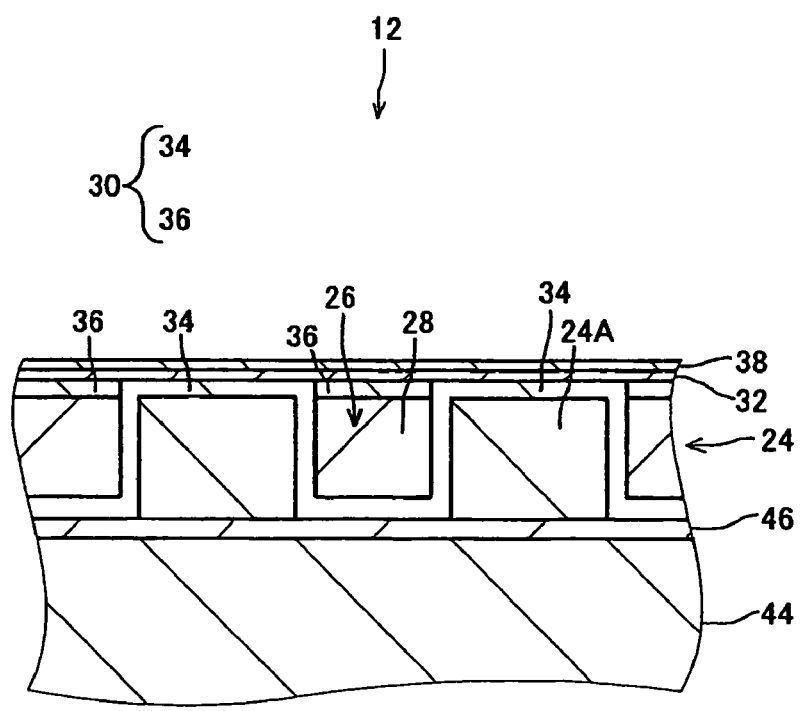
FIG. 3 is a schematic enlarged cross-sectional side view showing the configuration of the magnetic recording medium around recording elements and filling elements.

The magnetic recording medium 12 is a perpendicular recording type discrete track medium in the form of a circular plate. As shown in FIGS. 2 and 3, the magnetic recording medium 12 includes: a recording layer 24 formed in a predetermined concavo-convex pattern over a substrate 22, recording elements 24A being formed as convex portions of the concavo-convex pattern; filling elements 28 with which concave portions 26 between the recording elements 24A are filled; a conductive film 30 that has a smaller electric resistivity than the filling elements 28 and is formed on both the recording elements 24A and the filling elements 28; and a protective layer 32 that covers the recording elements 24A and the filling elements 28 and is in contact with an upper surface of the conductive film 30.

Examples of a material for the substrate 22 include nonmagnetic materials such as glass, an Al alloy covered with NiP, Si, and $Al_2O_3$.

The recording layer 24 has a thickness of 5 to 30 nm. Examples of a material for the recording layer 24 include CoCr alloys such as CoCrPt alloys, FePt alloys, a laminate of those materials, and materials in which ferromagnetic particles such as CoPt are contained in the form of a matrix in oxides such as $SiO_2$. The recording elements 24A are arranged to form concentric tracks at small intervals in the radial direction in a data region. FIGS. 2 and 3 show the recording elements 24A in this state. The recording elements 24A are arranged in a pattern of predetermined servo information in a servo region (not shown).

Examples of a material for the filling elements 28 include nonmagnetic materials, e.g., oxides such as $SiO_2$, $Al_2O_3$, $TiO_2$, and ferrites, nitrides such as AlN, and carbides such as SiC.

The conductive film 30 has a thickness of 1 to 5 nm and includes a first conductive film 34 formed over the recording elements 24A and a second conductive film 36 formed over the filling elements 28. Electric resistivities of the first and second conductive films 34 and 36 are smaller than that of the filling elements 28 and are also smaller than that of the protective layer 32.

The first conductive film 34 is also formed between a side face of each recording element 24A and a side face of each filling element 28. Moreover, the first conductive film 34 is formed on a bottom surface of the concave portions 26. Examples of a material for the first conductive film 34 include metals such as W (tungsten), Ni (nickel), Ta (tantalum), and Al (aluminum), alloys of those metals, and TaSi.

The second conductive film 36 is formed only over the filling elements 28. Examples of a material for the second conductive film 36 include metals, alloys, and TaSi, like the first conductive film 34. The material for the second conductive film 36 may be the same as that for the first conductive film 34 or be different from that for the first conductive film 34.

The protective layer 32 has a thickness of 1 to 5 nm. A material for the protective layer 32 is carbon called as diamond like carbon, for example, which is formed by a deposition method such as CVD which applies a bias voltage to the substrate 22. In the present description, the term "diamond like carbon" (hereinafter, referred to as "DLC") shall refer to a material of which main ingredient is carbon and has an amorphous structure and a hardness of about $2 \times 10^9$ to $8 \times 10^{10}$ Pa obtained by Vickers hardness measurements.

A lubricating layer 38 is formed on the protective layer 32. The lubricating layer 38 has a thickness of 1 to 2 nm. PFPE (perfluoro-polyether) and the like can be used as a material for the lubricating layer 38.

An underlayer 40, an antiferromagnetic layer 42, a soft magnetic layer 44, and a seed layer 46 for providing magnetic anisotropy in a thickness direction (that is perpendicular to a surface) to the recording layer 24 are formed between the substrate 22 and the recording layer 24 in that order from the substrate 22 side. The underlayer 40 has a thickness of 2 to 40 nm, and is formed of Ta, for example. The antiferromagnetic layer 42 has a thickness of 5 to 50 nm, and is formed of a PtMn alloy, an RuMn alloy, or the like. The soft magnetic layer 44 has a thickness of 50 to 300 nm. Examples of a material for the soft magnetic layer 44 include Fe (iron) alloys, Co (cobalt) amorphous alloys, and ferrites. The soft magnetic layer 44 may have a multilayer structure including a layer having soft magnetism and a nonmagnetic layer. The seed layer 46 has a thickness of 2 to 40 nm. Specific examples of a material for the seed layer 46 include nonmagnetic CoCr alloys, Ti, Ru, a multilayer structure of Ru and Ta, and MgO.

The operation of the magnetic recording medium 12 is now described.

Since the protective layer 32 of a carbon film formed by applying a bias voltage to the substrate 22 covers the recording elements 24A and the filling elements 28 in the magnetic recording medium 12, the magnetic recording medium 12 is good in both abrasion resistance and corrosion resistance. Therefore, the magnetic recording medium 12 can provide a good flying performance of the magnetic head 14.

Especially, since the conductive film 30 having a smaller electric resistivity than the filling elements 28 is formed over the recording elements 24A and the filling elements 28 and the protective layer 32 is formed to be in contact with the conductive film 30, a bias voltage can be uniformly applied onto the recording elements 24A and the filling elements 28 during formation of the protective layer 32, so that formation of polymer-like amorphous carbon can be suppressed. Therefore, the protective layer 32 is sufficiently hard and compact over its entire surface, and a damage or deformation is difficult to generate even if the magnetic head 14 intermittently comes into contact with the protective layer 32. Accordingly, the flying performance of the magnetic head 14 can be kept good.

Moreover, the conductive film 30 having a smaller electric resistivity than the filling elements 28 is formed over the recording elements 24A and the filling elements 28 and therefore static electricity is difficult to generate in the magnetic recording medium 12. Thus, degradation of the flying performance of the magnetic head caused by foreign matter such as dust can be suppressed. In addition, the effect of suppressing generation of static electricity is enhanced by the conductive film 30 because the conductive film 30 has a smaller electric resistivity than the protective layer 32.

Since the first conductive film 34 is also formed between the recording elements 24A and the filling elements 28 in the magnetic recording medium 12, corrosion of the recording elements 24A caused by oxygen or the like contained in the filling elements 28 can be suppressed. Thus, good recording and reproducing characteristics can be kept.

Incidentally, the recording elements 24A are formed of a metal and have a small electric resistivity. Thus, the effect of suppressing formation of polymer-like amorphous carbon and the effect of suppressing generation of static electricity can be obtained even if the first conductive film 34 is omitted. However, in the case where the material for the recording elements 24A is a material in which ferromagnetic particles such as CoPt are contained in the form of a matrix in oxide such as $SiO_2$, the electric resistivity of the recording elements 24A is higher than that of the recording elements 24A formed of a metal only. In this case, the effects of suppressing formation of polymer-like amorphous carbon and generation of static electricity can be ensured by depositing the first conductive film 34 on the recording elements 24A.

The recording elements 24A are arranged in the form of tracks in the data region in the magnetic recording medium 12. Thus, it is less likely that problems, e.g., incorrect recording of information onto a track adjacent to a target track for which recording is to be performed and crosstalk during reproducing are caused.

Furthermore, the recording elements 24A are separated from each other and no recording layer 24 exists in the concave portions 26 between the recording elements 24A in the magnetic recording medium 12. Thus, no noise is generated from the concave portions 26. In this regard, good recording and reproducing characteristics can be obtained.

Figure 4:
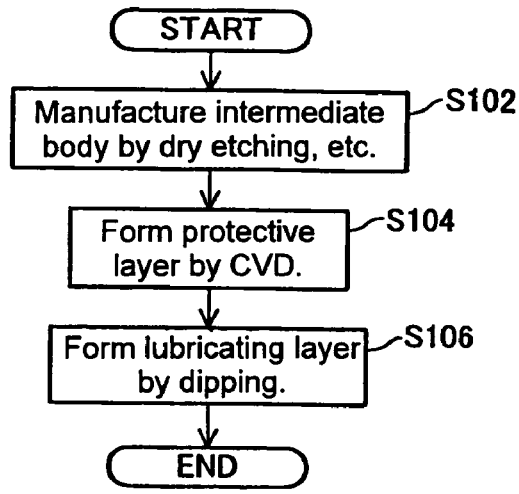
FIG. 4 is a flowchart generally showing manufacturing steps of the magnetic recording medium.

A manufacturing method of the magnetic recording medium 12 is now described based on a flowchart shown in FIG. 4.

First, the underlayer 40, the antiferromagnetic layer 42, the soft magnetic layer 44, the seed layer 46, a continuous recording layer (unprocessed recording layer 24), a first mask layer, and a second mask layer are formed over a substrate 22 by sputtering or the like in that order. A resist layer is further applied by spin coating. The first mask layer can be formed of Ta, for example. The second mask layer can be formed of Ni, for example. An example of a material for the resist layer is a positive resist (PFM-300A9 manufactured by Sumitomo Chemical Co., Ltd.).

A concavo-convex pattern corresponding to a servo pattern in a servo region and a track pattern in a data region is transferred onto the resist layer by means of a transfer device (not shown) by nano-imprinting, and thereafter the resist layer under a bottom surface of concave portions is removed by reactive ion beam etching using $O_2$ gas. Then, the second mask layer under the bottom surface of the concave portions is removed by ion beam etching using Ar gas, the first mask layer under the bottom surface of the concave portions is removed by reactive ion etching using $CF_4$ gas as a reactive gas, and the continuous recording layer under the bottom surface of the concave portions is removed by reactive ion etching using CO gas and $NH_3$ gas as a reactive gas so as to divide the continuous recording layer into a number of recording elements 24A. In this manner, the recording layer 24 having the concavo-convex pattern is formed. Then, the first mask layer remaining on the recording elements 24A is completely removed by reactive ion etching using $CF_4$ gas as a reactive gas. Alternatively, ion beam etching may be performed to divide the continuous recording layer into a number of recording elements 24A and form the recording layer 24 in the concavo-convex pattern.

A first conductive film 34 is then deposited by sputtering on a surface of an object to be processed. The first conductive film 34 is formed not only on the upper surface of the recording elements 24A but also on side faces of the recording elements 24A and the bottom surface of the concave portions 26.

A filling material (a material for filling elements 28) is then deposited on the surface of the object to be processed by bias sputtering, so as to have a thickness that is slightly smaller than a depth of the concave portions 26. The filling material is deposited on the object to be processed in a shape which follows the concavo-convex pattern of the recording layer 24 and in which concavity and convexity of a surface are suppressed to a certain degree, so as to cover the recording elements 24A. That is, the concave portion 26 is filled with the filling element 28 to a position slightly lower than an upper surface of the first conductive film 34 over the recording elements 24A. In the deposition of the filling material, a bias voltage applied to the substrate 22 is adjusted so as to prevent the filling material from adhering to ends of the first conductive film 34 over the recording elements 24A.

A second conductive film 36 is then deposited on the filling material by sputtering. The second conductive film 36 is formed on the filling element 28 in the concave portion 26. The second conductive film 36 is also deposited on an excess part of the filling material located over the recording elements 24A.

The excess part of the filling material and the second conductive film 36 that are located at an upper level than the upper surface of the first conductive film 34 over the recording elements 24A are then removed by CMP, thereby flattening the surface. In this flattening step, the processed amount is adjusted in such a manner that the first conductive film 34 remains over the recording elements 24A and the second conductive film 36 remains on the filling elements 28. Alternatively, ion beam etching may be performed for removing the excess part of the filling material and the second conductive film 36 that are located at an upper level than the upper surface of the first conductive film 34 over the recording elements 24A, so as to flatten the surface. In this case, when the first conductive film 34 is formed from a material having a lower etching rate in ion beam etching than the filling material, e.g., W, the first conductive film 34 can also be used as a stop film for protecting the recording elements 24A against etching.

Figure 5:
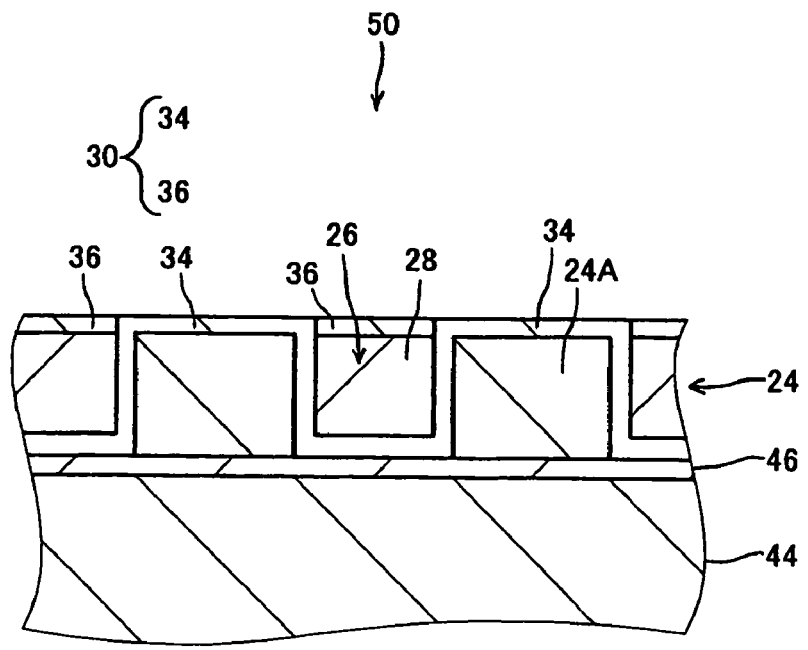
FIG. 5 is a schematic cross-sectional side view showing an intermediate body in the manufacturing steps of the magnetic recording medium.

In this manner, as shown in FIG. 5, an intermediate body 50 in the manufacturing steps is obtained, which includes: the recording layer 24 formed in the predetermined concavo-convex pattern over the substrate 22, the recording elements 24A being formed as convex portions of the concavo-convex pattern; the nonmagnetic filling elements 28 with which the concave portions 26 between the recording elements 24A are filled; and the conductive film 30 that has a smaller electric resistivity than the filling elements 28 and is formed over both the recording elements 24A and the filling elements 28 (S102).

Then, a protective layer 32 of carbon is formed to be in contact with an upper surface of the conductive film 30 by CVD, while a bias voltage is applied to the substrate 22. In this manner, the protective layer 32 covers the recording elements 24A and the filling elements 28 (S104). More specifically, when a source gas such as hydrocarbon gas, e.g., $CH_4$ (methane) is supplied into a chamber, the source gas is decomposed into carbon and hydrogen by plasma decomposition on a surface of an object to be processed in the chamber, thereby depositing a carbon film on the conductive film 30. The protective layer 32 is formed to be in contact with the second conductive film 36 that has a smaller electric resistivity than the filling element 28 and is formed over the filling elements 28. Since the conductive film 30 having a smaller electric resistivity than the filling elements 28 is formed over the recording elements 24A and the filling element 28 and the protective layer 32 is then formed to be in contact with the conductive film 30, as described above, a bias voltage can be uniformly applied onto the recording elements 24A and the filling elements 28 and therefore formation of polymer-like amorphous carbon can be suppressed.

The lubricating layer 38 is then formed on the protective layer 32 by dipping (S106). In this manner, the magnetic recording medium 12 is obtained.

Next, a second exemplary embodiment of the present invention is described.

Figure 6:
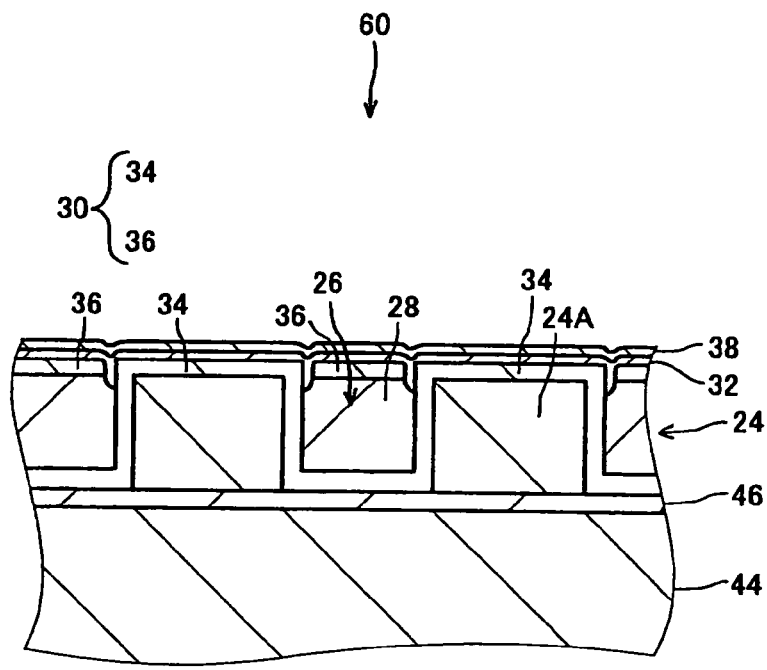
FIG. 6 is a schematic enlarged cross-sectional side view showing the configuration of a magnetic recording medium around recording elements and filling elements according to a second exemplary embodiment of the present invention.

As shown in FIG. 6, a magnetic recording medium 60 of the second exemplary embodiment has a feature that grooves are formed in the upper surface of the filling elements 28 near boundaries between the filling elements 28 and the recording elements 24A and the second conductive film 36 is formed on the upper surface of the filling elements 28 in a portion other than the grooves. Except for the above, the magnetic recording medium 60 is the same as the magnetic recording medium 12 of the first exemplary embodiment and the description thereof is omitted.

When dry etching such as ion beam etching is used in the step of removing the excess part of the filling material and the second conductive film 36 so as to flatten the surface, the grooves are formed in the upper surface of the filling elements 28 near the boundaries between the filling element 28 and the recording elements 24A and the second conductive film 36 is not formed on a part of the upper surface of the filling elements 28, under some etching conditions.

However, even in the above case, it is expected that the existence of the second conductive film 36 on the filling elements 28 provide the effects of suppressing generation of static electricity and keeping a good head flying performance. Thus, the existence of the second conductive film 36 over the filling elements 28 can contribute to improvement of reliability.

Incidentally, a portion of the protective layer 32 that is formed on the grooves in the upper surface of the filling elements 28 is not in contact with the second conductive film 36. Therefore, that portion may become polymer-like amorphous carbon. However, the protective layer 32 is formed to follow the grooves and therefore the portion of the protective layer 32 that may become polymer-like amorphous carbon is formed to be concave toward the substrate 22 as compared with other portions. Therefore, even if polymer-like amorphous carbon is formed on the grooves, it is less likely that a damage or deformation affecting the flying performance of the magnetic head is caused by intermittent contact of the magnetic head with that concave portion. That is, the good head flying performance can be kept.

Next, a third exemplary embodiment of the present invention is described.

Figure 7:
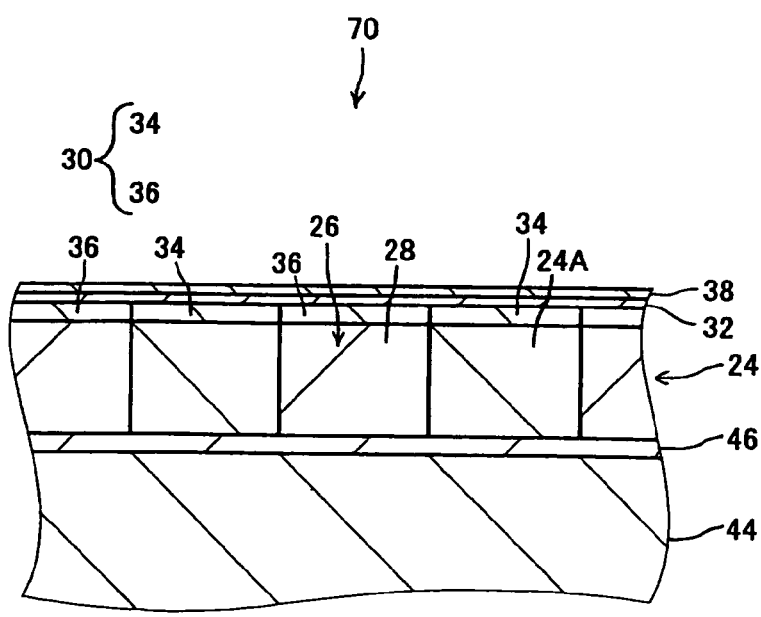
FIG. 7 is a schematic enlarged cross-sectional side view showing the configuration of a magnetic recording medium around recording elements and filling elements according to a third exemplary embodiment of the present invention.

As shown in FIG. 7, a magnetic recording medium 70 of the third exemplary embodiment has a feature that the first conductive film 34 is formed only over the upper surface of the recording elements 24A, unlike the magnetic recording medium 12 of the first exemplary embodiment in which the first conductive film 34 is formed not only over the upper surface of the recording elements 24A but also over the side faces of the recording elements 24A and the bottom surface of the concave portions 26. Except for the above, the magnetic recording medium 70 is the same as the magnetic recording medium 12 of the first exemplary embodiment and therefore the description thereof is omitted.

In the magnetic recording medium 70, the conductive film 30 having a smaller electric resistivity than the filling elements 28 is formed over the recording elements 24A and the filling elements 28 and the protective layer 32 is formed to be in contact with the conductive film 30, as in the magnetic recording medium 12 of the first exemplary embodiment. Therefore, during formation of the protective layer 32, a bias voltage can be uniformly applied onto the recording elements 24A and the filling elements 28, so that formation of polymer-like amorphous carbon can be suppressed.

Moreover, the conductive film 30 having a smaller electric resistivity than the filling elements 28 is formed over the recording elements 24A and the filling elements 28 in the magnetic recording medium 70, too. Therefore, generation of static electricity can be suppressed.

A manufacturing method of the magnetic recording medium 70 is briefly described.

When manufacturing the magnetic recording medium 12 of the first exemplary embodiment, the first conductive film 34 is formed after the recording layer 24 having the concavo-convex pattern is formed by processing the continuous recording layer. On the other hand, when manufacturing the magnetic recording medium 70, the first conductive film 34 is formed between the continuous recording layer and the first mask layer in advance and the first conductive film 34 is processed and divided together with the continuous recording layer. Except for the above, the manufacturing steps of the magnetic recording medium 70 are the same as those of the magnetic recording medium 12 and therefore the description thereof is omitted. In this manner, the magnetic recording medium 70 in which the first conductive film 34 is formed only over the recording elements 24A but is not formed on the side faces of the recording elements 24A and the bottom surface of the concave portions 26 is obtained.

Next, a fourth exemplary embodiment of the present invention is described.

Figure 8:
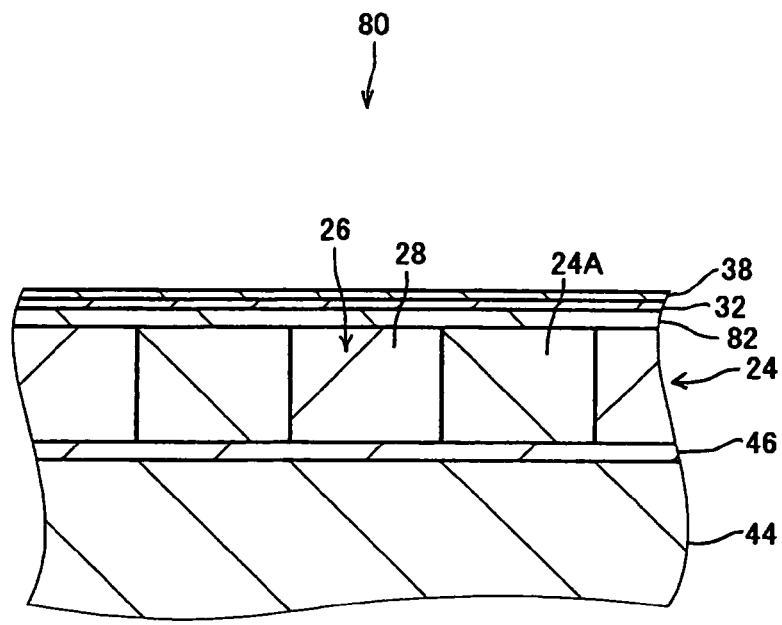
FIG. 8 is a schematic enlarged cross-sectional side view showing the configuration of a magnetic recording medium around recording elements and filling elements according to a fourth exemplary embodiment of the present invention.

As shown in FIG. 8, a magnetic recording medium 80 of the fourth exemplary embodiment has a feature that a conductive film 82 formed over the recording elements 24A and the filling elements 28 is a continuous film formed from a single material, unlike the magnetic recording medium 12 of the first exemplary embodiment in which the conductive film 30 includes the first conductive film 34 formed over the recording elements 24A and the second conductive film 36 formed over the filling elements 28. Except for the above, the magnetic recording medium 80 is the same as the magnetic recording medium 12 and therefore the description thereof is omitted. Examples of a material for the conductive film 82 include metals, alloys, and TaSi that are the same as those for the first conductive film 34 and the second conductive film 36.

In the magnetic recording medium 80, the conductive film 82 having a smaller electric resistivity than the filling element 28 is formed over the recording elements 24A and the filling elements 28 and the protective layer 32 is formed to be in contact with the conductive film 82, as in the magnetic recording medium 12. Therefore, during formation of the protective layer 32, a bias voltage can be uniformly applied onto the recording elements 24A and the filling elements 28, so that formation of polymer-like amorphous carbon can be suppressed.

Especially, since the conductive film 82 is a continuous film formed from a single material, the effect of making a bias voltage applied onto the recording elements 24A and the filling elements 28 uniform is extremely high and the effect of suppressing generation of polymer-like amorphous carbon is further enhanced. Moreover, since the conductive film 82 serving as an underlayer for the protective layer 32 is a continuous film formed from a single material, a grain size and a structure in the protective layer 32 that are easily affected by its underlayer can be made uniform from a stage of initial growth. That is, an effect of making the nature of the protective layer 32 more uniform can be obtained.

In addition, the conductive film 82 having a smaller electric resistivity than the filling element 28 is formed over the recording elements 24A and the filling elements 28 in the magnetic recording medium 80, too. Therefore, generation of static electricity can be suppressed.

A manufacturing method of the magnetic recording medium 80 is briefly described.

When manufacturing the magnetic recording medium 12 of the first exemplary embodiment, the first conductive film 34, the filling material, and the second conductive film 36 are deposited over the recording layer 24 having the concavo-convex pattern in that order and thereafter a surface is flattened. On the other hand, when manufacturing the magnetic recording medium 80, the filling material is deposited over the recording layer 24 having the concavo-convex pattern, the surface is flattened, and thereafter the conductive film 82 is deposited. Except for the above, the manufacturing steps of the magnetic recording medium 80 are the same as those of the magnetic recording medium 12 of the first exemplary embodiment and therefore the description thereof is omitted. In this manner, the magnetic recording medium 80 can be obtained, in which the continuous conductive film 82 formed from a single material is formed over both the recording elements 24A and the filling elements 28.

Even if the filling material is left on the recording elements 24A after the filling material is deposited so as to fill the concave portions 26 with the filling elements 28 and a surface is then flattened, the effect of suppressing formation of polymer-like amorphous carbon and the effect of suppressing generation of static electricity can be surely obtained by depositing the conductive film 82 on the thus left filling material on the recording elements 24A.

Next, a fifth exemplary embodiment of the present invention is described.

Figure 9:
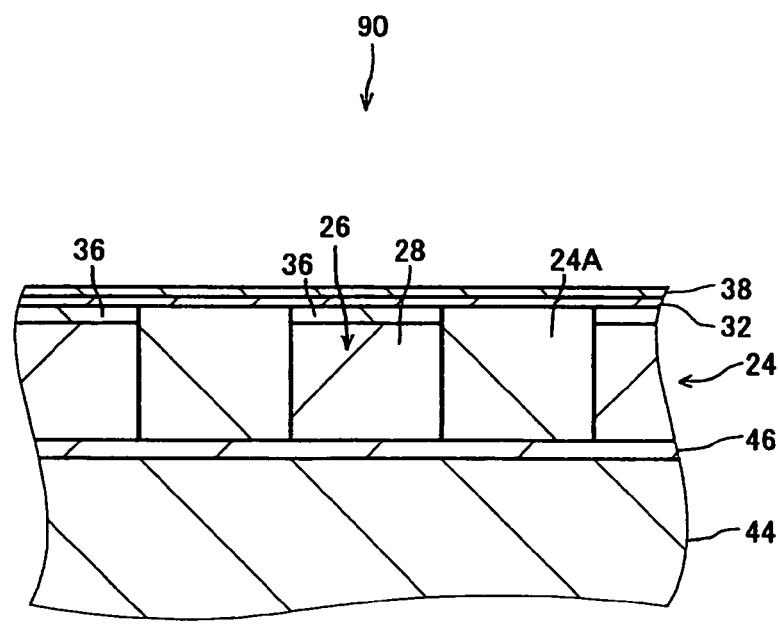
FIG. 9 is a schematic enlarged cross-sectional side view showing the configuration of a magnetic recording medium around recording elements and filling elements according to a fifth exemplary embodiment of the present invention.

As shown in FIG. 9, a magnetic recording medium 90 of the fifth exemplary embodiment has a configuration in which the first conductive film 34 is omitted from the structure of the magnetic recording medium 12 of the first exemplary embodiment. The magnetic recording medium 90 has a feature that the upper surface of the recording elements 24A is in contact with the protective layer 32. Please note that a height of the upper surface of the recording elements 24A is coincident with that of an upper surface of the second conductive film 36. Except for the above, the magnetic recording medium 90 is the same as the magnetic recording medium 12 and the description thereof is omitted.

In the magnetic recording medium 90, the second conductive film 36 having a smaller electric resistivity than the filling element 28 is formed over the filling element 28, and the protective layer 32 is formed to be in contact with the second conductive film 36 and the recording elements 24A that contain a metal and are electrically conductive, as in the magnetic recording medium 12 of the first exemplary embodiment. Therefore, formation of polymer-like amorphous carbon can be suppressed.

Moreover, the conductive film 30 having a smaller electric resistivity than the filling element 28 is formed over the filling elements 28 in the magnetic recording medium 90, too. Therefore, generation of static electricity can be suppressed.

Furthermore, the upper surface of the recording elements 24A is in contact with the protective layer 32 in the magnetic recording medium 90. Therefore, a magnetic gap between the recording elements 24A and the magnetic head 14 is small and therefore recording and reproducing characteristics are favorable.

A manufacturing method of the magnetic recording medium 90 is briefly described.

When manufacturing the magnetic recording medium 12 of the first exemplary embodiment, the first conductive film 34, the filling material, and the second conductive film 36 are deposited over the recording layer 24 having the concavo-convex pattern in that order and a surface is then flattened. On the other hand, in a case of manufacturing the magnetic recording medium 90, deposition of the first conductive film 34 is omitted. Except for the above, the manufacturing steps of the magnetic recording medium 90 are the same as those of the magnetic recording medium 12 and therefore the description thereof is omitted. In this manner, the magnetic recording medium 90 can be obtained, in which the second conductive film 36 is formed only over the filling elements 28 but is not formed over the recording elements 24A and the upper surface of the recording elements 24A is in contact with the protective layer 32.

In the aforementioned first to fifth exemplary embodiments, the protective layer 32 is formed by CVD which applies a bias voltage to the substrate 22. However, the present invention can also be applied to a magnetic recording medium having a protective layer formed by another deposition method, as long as that deposition method forms a carbon film while applying a bias voltage to the substrate.

In the aforementioned first to fifth exemplary embodiments, insulating materials, e.g., oxides such as $SiO_2$, $Al_2O_3$, $TiO_2$, and ferrites, nitrides such as AlN, and carbides such as SiC are described as the exemplary materials for the filling elements 28. However, when using a material having a certain level of electric conductivity as the material for the filling elements 28, the effects of suppressing formation of polymer-like amorphous carbon and generation of static electricity can also be obtained by forming a conductive film having a smaller electric resistivity than the filling elements 28 over the filling element 28.

Moreover, in the case where a material having a certain level of electric conductivity is used as the material for the filling elements 28 and a continuous conductive film formed from a single material is formed over both the recording elements and the filling elements as in the aforementioned fourth exemplary embodiment, the conductive film having a larger electric resistivity than the filling element may be formed over the recording elements and the filling elements. In this case, a bias voltage is uniformly applied onto the recording elements and the filling elements, too. Therefore, the effect of suppressing formation of polymer-like amorphous carbon can be obtained. In addition, the grain size and the structure in the protective layer 32 that are easily affected by an underlayer (for the protective layer 32) are constant from a stage of initial growth. Therefore, the effect of making the nature of the protective layer 32 more uniform can be obtained.

In the aforementioned first to fifth exemplary embodiments, nonmagnetic materials, e.g., oxides such as $SiO_2$, $Al_2O_3$, $TiO_2$, and ferrites, nitrides such as AlN, and carbides such as SiC are described as the material for the filling elements 28. However, magnetic materials such as a soft magnetic material may be used as the material for the filling elements 28, depending on required magnetic properties.

In the aforementioned first to fifth exemplary embodiments, the underlayer 40, the antiferromagnetic layer 42, the soft magnetic layer 44, and the seed layer 46 are formed between the substrate 22 and the recording layer 24. However, the configuration between the substrate 22 and the recording layer 24 may be appropriately changed in accordance with a type or needs of a magnetic recording medium. Moreover, the underlayer 40, the antiferromagnetic layer 42, the soft magnetic layer 44, and the seed layer 46 may be omitted, so that the recording layer 24 is directly formed on the substrate 22.

In the aforementioned first to fifth exemplary embodiments, the magnetic recording medium 12 is a perpendicular recording type magnetic disk. However, the present invention can also be applied to a longitudinal recording type magnetic disk.

In the aforementioned first to fifth exemplary embodiments, the recording layer 24 and the other layers are formed on one side of the substrate 22 in the magnetic recording medium 12. However, the present invention can also be applied to a double-sided magnetic recording medium in which a recording layer and other layers are formed on each of two sides of a substrate.

In the aforementioned first to fifth exemplary embodiments, the magnetic recording medium 12 is a discrete track medium in which the recording elements 24A are arranged side by side at small intervals in the radial direction of tracks in the data region. Alternatively, the present invention can be applied to a patterned medium in which the recording elements 24A are arranged side by side at small intervals both in the circumferential direction and the radial direction of the tracks. Moreover, the present invention can also be applied to a magnetic disk having a spirally formed track. In addition, the present invention can also be applied to a magneto-optical disc such as MO, a heat assisted magnetic disk which uses magnetism and heat, and other magnetic recording media each of which includes a recording layer having a concavo-convex pattern and has a shape other than a disk-like shape, e.g., a magnetic tape.

WORKING EXAMPLE 1

The magnetic recording medium 12 was manufactured in the manner described in the first exemplary embodiment. The structure of a main part of the manufactured magnetic recording medium 12 is described below.

The substrate 22 had a diameter of approximately 65 mm and was formed of glass. The recording layer 24 had a thickness of approximately 18 nm and was formed of a CoCrPt alloy. In the data region, a width of the recording element 24A in the radial direction was 100 nm and a width of the concave portion 26 in the radial direction was 100 nm too. A depth of the concave portion 26 was 18 nm.

The first conductive film 34 had a thickness of approximately 1 nm and was formed of W. The filling element 28 was formed of $SiO_2$. The second conductive film 36 had a thickness of approximately 2 nm and was formed of Ta.

The protective layer 32 had a thickness of approximately 3 nm and was formed of DLC. The lubricating layer 38 had a thickness of approximately 1.5 nm and was formed of PFPE.

A specific method for depositing the first conductive film 34, the filling material, and the second conductive film 36, and the protective layer 32 is briefly described.

First, the first conductive film 34 was deposited by sputtering on the recording layer 24 having a concavo-convex pattern so as to have a thickness of approximately 3 nm. In this deposition, a deposition power (i.e., a power applied to target) was set to approximately 500 W, a flow rate of Ar gas was set to approximately 50 sccm, and a pressure inside a vacuum chamber was set to approximately 0.5 Pa. No bias voltage was applied to the substrate 22.

The filling material was then deposited on the first conductive film 34 by bias sputtering to have a thickness of approximately 17 nm. In this deposition, the deposition power (i.e., the power applied to target) was set to approximately 500 W, the bias power (i.e., the power applied to the substrate 22) was set to approximately 250 W, the flow rate of Ar gas was set to approximately 50 sccm, and the pressure inside the vacuum chamber was set to approximately 0.3 Pa.

The second conductive film 36 was then deposited on the filling material by sputtering to have a thickness of approximately 4 nm. In this deposition, the deposition power (i.e., the power applied to target) was set to approximately 500 W, the flow rate of Ar gas was set to approximately 50 sccm, and the pressure inside the vacuum chamber was set to approximately 0.5 Pa. No bias voltage was applied to the substrate 22.

An excess part of the filling material and the second conductive film 36 that were located at an upper level than the upper surface of the first conductive film 34 over the recording elements 24A were removed by CMP so as to flatten a surface. In this flattening step, a part of the first conductive film 34 was also removed in a thickness direction. SS25 (manufactured by Cabot Microelectronics) was used as CMP slurry and a double-layer pad, i.e., IC1000/Suba400 was used. A load of the pad was set to 133 $g/cm^2$, a rotation speed of a platen was set to 30 rpm, and a rotation speed of an object to be processed was set to 30 rpm. A process time was adjusted in such a manner that the first conductive film 34 having a thickness of approximately 1 nm was left on the recording elements 24A and the second conductive film 36 having a thickness of approximately 2 nm was left on the filling elements 28 in the concave portions 26.

The protective layer 32 was then formed by CVD to be in contact with the upper surface of the first conductive film 34 and the upper surface of the second conductive film 36. $CH_4$ (methane) gas was used as a source gas, a flow rate of $CH_4$ gas was set to 200 sccm, and a pressure inside a chamber was set to 1 Pa. An input power was set to 500 W. A bias voltage (i.e., a voltage applied to the substrate 22) was set to 200 V.

A lubricating layer 38 was then applied onto the protective layer 32 by dipping. In this manner, the magnetic recording medium 12 was obtained.

A state of the protective layer 32 of the magnetic recording medium 12 was analyzed by Raman spectroscopy. A value of Id/Ig was 1.0 to 1.2, which represented characteristics of DLC. Moreover, a behavior of the magnetic head 14 with respect to the magnetic recording medium 12 was examined. As a result of the examination, it was confirmed that a good flying performance was kept.

WORKING EXAMPLE 2

The magnetic recording medium 80 was manufactured in the manner described in the fourth exemplary embodiment.

The configuration of the substrate 22, the recording layer 24, the filling element 28, the protective layer 32, and the lubricating layer 38 was the same as that in Working Example 1.

The conductive film 82 had a thickness of approximately 1 nm and was formed of Ta.

A specific method for depositing the filling material and the conductive film 82 was briefly described.

First, the filling material was deposited on the recording layer 24 having a concavo-convex pattern by bias sputtering to have a thickness of approximately 80 nm. In this deposition, the deposition power (i.e., the power applied to target) was set to approximately 500 W, the bias power (i.e., the power applied to the substrate 22) was set to approximately 250 W, the flow rate of Ar gas was set to approximately 50 sccm, and the pressure inside the vacuum chamber was set to approximately 0.3 Pa.

An excess part of the filling material located at an upper level than the upper surface of the recording elements 24A was then removed by ion beam etching, thereby flattening a surface. In this flattening step, the flow rate of Ar gas was set to approximately 11 sccm, the pressure inside the chamber was set to approximately 0.05 Pa, a beam voltage was set to approximately 500 V, a beam current was set to approximately 500 mA, and a suppressor voltage was set to approximately 400 V.

The conductive film 82 was then deposited on the recording elements 24A and the filling elements 28 by sputtering to have a thickness of approximately 1 nm. In this deposition, the deposition power (i.e., the power applied to target) was set to approximately 500 W, the flow rate of Ar gas was set to approximately 50 sccm, and the pressure inside the chamber was set to approximately 0.5 Pa. No bias voltage was applied to the substrate 22.

The protective layer 32 was then formed to be in contact with the upper surface of the conductive film 82 by CVD, as in Working Example 1. Then, the lubricating layer 38 was applied onto the protective layer 32 by dipping. In this manner, the magnetic recording medium 80 was obtained.

The state of the protective layer 32 of the magnetic recording medium 80 was analyzed by Raman spectroscopy. A value of Id/Ig was 1.0 to 1.1, which represented characteristics of DLC. Moreover, the behavior of the magnetic head 14 with respect to the magnetic recording medium 80 was examined. As a result of this examination, it was confirmed that a good flying performance was kept.

WORKING EXAMPLE 3

The magnetic recording medium 90 was manufactured in the manner described in the fifth exemplary embodiment. The structure of the substrate 22, the recording layer 24, the filling elements 28, the second conductive film 36, the protective layer 32, and the lubricating layer 38 were the same as that in Working Example 1.

A specific method for depositing the filling material and the second conductive film 36 is briefly described.

First, the filling material was deposited on the recording layer 24 having a concavo-convex pattern by bias sputtering to have a thickness of approximately 16 nm. In this deposition, the deposition power (i.e., the power applied to target) was set to approximately 500 W, the bias power (i.e., the power applied to the substrate 22) was set to approximately 250 W, the flow rate of Ar gas was set to approximately 50 sccm, and the pressure inside the chamber was set to approximately 0.3 Pa.

The second conductive film 36 was then deposited on the filling material by sputtering to have a thickness of approximately 4 nm. In this deposition, the deposition power (i.e., the power applied to target) was set to approximately 500 W, the flow rate of Ar gas was approximately 50 sccm, and the pressure inside the chamber was set to approximately 0.5 Pa. No bias voltage was applied to the substrate 22.

An excess part of the filling material and the second conductive film 36 that were located at an upper level than the upper surface of the recording elements 24A were then removed by CMP, thereby flattening a surface. The CMP condition was set to be the same as that in Working Example 1. The process time was adjusted so as to leave the second conductive film 36 having a thickness of approximately 2 nm on the filling elements 28 in the concave portions 26.

The protective layer 32 was then formed to be in contact with the upper surface of the second conductive film 36 by CVD, as in Working Example 1. Furthermore, the lubricating layer 38 was applied onto the protective layer 32 by dipping. In this manner, the magnetic recording medium 90 was obtained.

The state of the protective layer 32 of the magnetic recording medium 90 was analyzed by Raman spectroscopy. A value of Id/Ig was 1.1 to 1.3, which represented characteristics of DLC. Moreover, the behavior of the magnetic head 14 with respect to the magnetic recording medium 90 was examined. As a result of the examination, a good flying performance was obtained.

COMPARATIVE EXAMPLE

A plurality of magnetic recording media were manufactured, in each of which the conductive film 82 was omitted from the structure in Working Example 2 and the protective layer 32 was formed to be in contact with the recording elements 24A and the filling elements 28. The structure of the substrate 22, the recording layer 24, the filling elements 28, the protective layer 32, and the lubricating layer 38 were the same as that in Working Example 2.

Moreover, the condition for bias sputtering for depositing the filling material, the condition for ion beam etching for removing the excess part of the filling material, and the condition for CVD for depositing the protective layer 32 in Comparative Example were also the same as those in Working Example 2.

For a part of the thus manufactured magnetic recording media, it was confirmed that abnormal discharge partially occurred during the deposition of the protective layer 32, and a blackened portions were formed in the surface of the protective layer 32.

Moreover, for the other magnetic recording media, the state of the protective layer 32 was analyzed by Raman spectroscopy. A value of Id/Ig was approximately 2.0, which did not represent sufficient characteristics of DLC.

Furthermore, the behavior of the magnetic head 14 with respect to each of those magnetic recording media was examined. A damage caused by crash with the magnetic recording medium was found in the magnetic head 14.

It is considered that the magnetic recording medium and the magnetic head intermittently come in contact with each other. In Comparative Example, it is considered that a scratch or contamination was caused by intermittent contact of the magnetic head with the protective layer having an insufficient hardness and that scratch or contamination degraded the flying performance of the magnetic head. On the other hand, in Working Examples 1 to 3, the protective layer had a sufficient hardness over its entire surface. Therefore, it is considered that intermittent contact of the magnetic head with the protective layer did not cause a scratch or contamination and the flying performance of the magnetic head was kept favorable.

The present invention can be applied to a magnetic recording medium including a recording layer formed in a predetermined concavo-convex pattern, such as a discrete track medium and a patterned medium, and a magnetic recording and reproducing apparatus including that magnetic recording medium, for example.

What is claimed is:

1. A magnetic recording medium comprising:
   a recording layer formed in a predetermined concavo-convex pattern over a substrate, recording elements being formed as convex portions of the concavo-convex pattern;
   filling elements with which concave portions between the recording elements are filled;
   a conductive film having an electric resistivity smaller than the filling elements, the conductive film being formed only over the filling elements out of the recording elements and the filling elements; and
   a protective layer covering the recording elements and the filling elements and being in contact with an upper surface of the conductive film wherein
   an upper surface of the recording elements is in contact with the protective layer.

2. The magnetic recording medium according to claim 1, wherein
   the protective layer is a film of carbon formed by a deposition method which applies a bias voltage to the substrate.

3. The magnetic recording medium according to claim 1, wherein
   the conductive film is also formed between a side face of each recording element and a side face of each filling element.

4. The magnetic recording medium according to claim 2, wherein
   the conductive film is also formed between a side face of each recording element and a side face of each filling element.

5. The magnetic recording medium according to claim 1, wherein
   the conductive film has a smaller electric resistivity than the protective layer.

6. A magnetic recording and reproducing apparatus comprising:
   the magnetic recording medium according to claim 1; and
   a magnetic head provided to be capable of being flown close to a surface of the magnetic recording medium in order to perform recording and/or reproducing of data with respect to the magnetic recording medium.

7. The magnetic recording medium according to claim 1, wherein
   a side face of each recording element being in contact with a side face of each filling element.

8. The magnetic recording medium according to claim 1, wherein
   the conductive film is thinner than the filling elements.

9. A manufacturing method of a magnetic recording medium comprising:
   an intermediate body manufacturing step of manufacturing an intermediate body including a recording layer formed in a predetermined concavo-convex pattern in which recording elements are formed as convex portions over a substrate, filling elements with which concave portions between the recording elements are filled, and a conductive film that has a smaller electric resistivity than the filling elements and is formed only over the filling elements out of the recording elements and the filling elements; and
   a protective layer forming step of forming a protective layer of carbon to be in contact with an upper surface of the conductive film while applying a bias voltage to the substrate, thereby covering the recording elements and the filling elements, wherein
   an upper surface of the recording elements is in contact with the protective layer.

* * * * *